INVENTORS
CESARE BARBIERI
JOSEPH R. HEARD
BY
ATTORNEY.

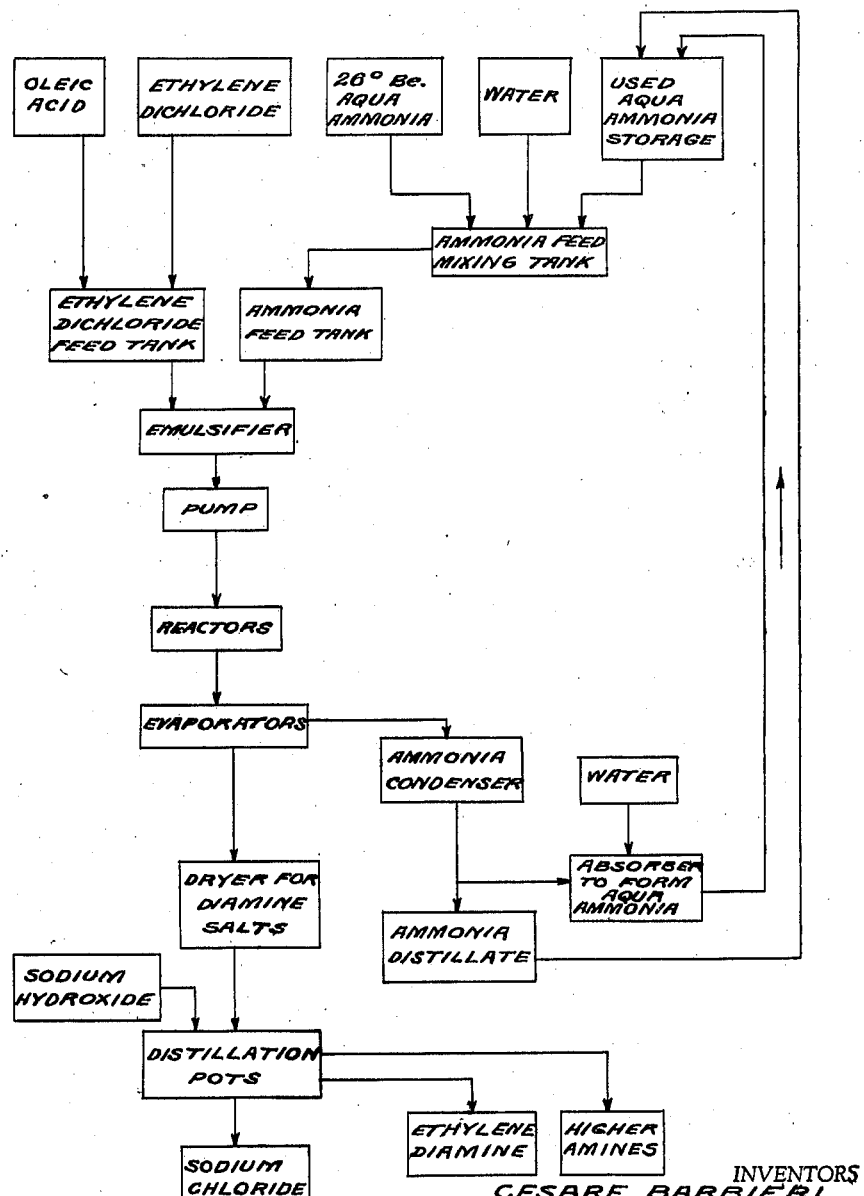

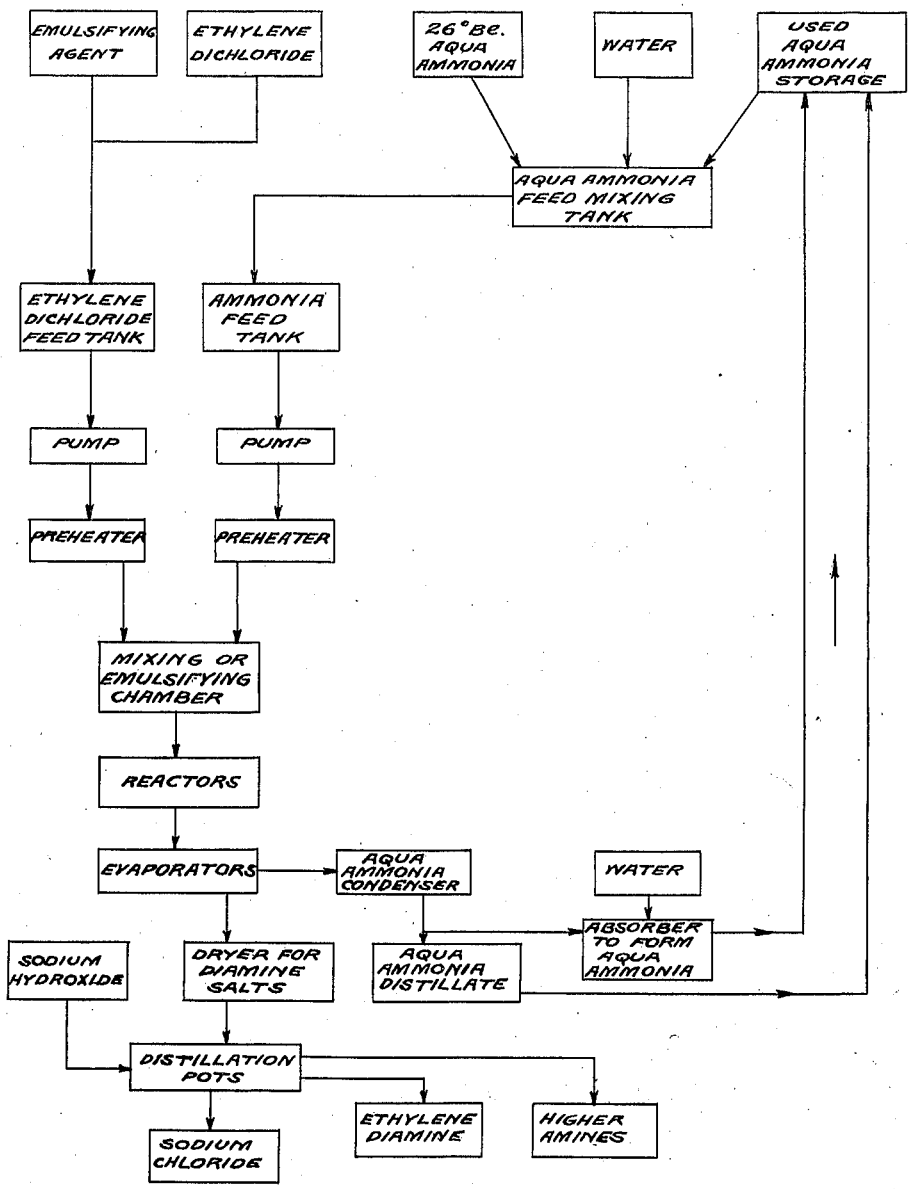

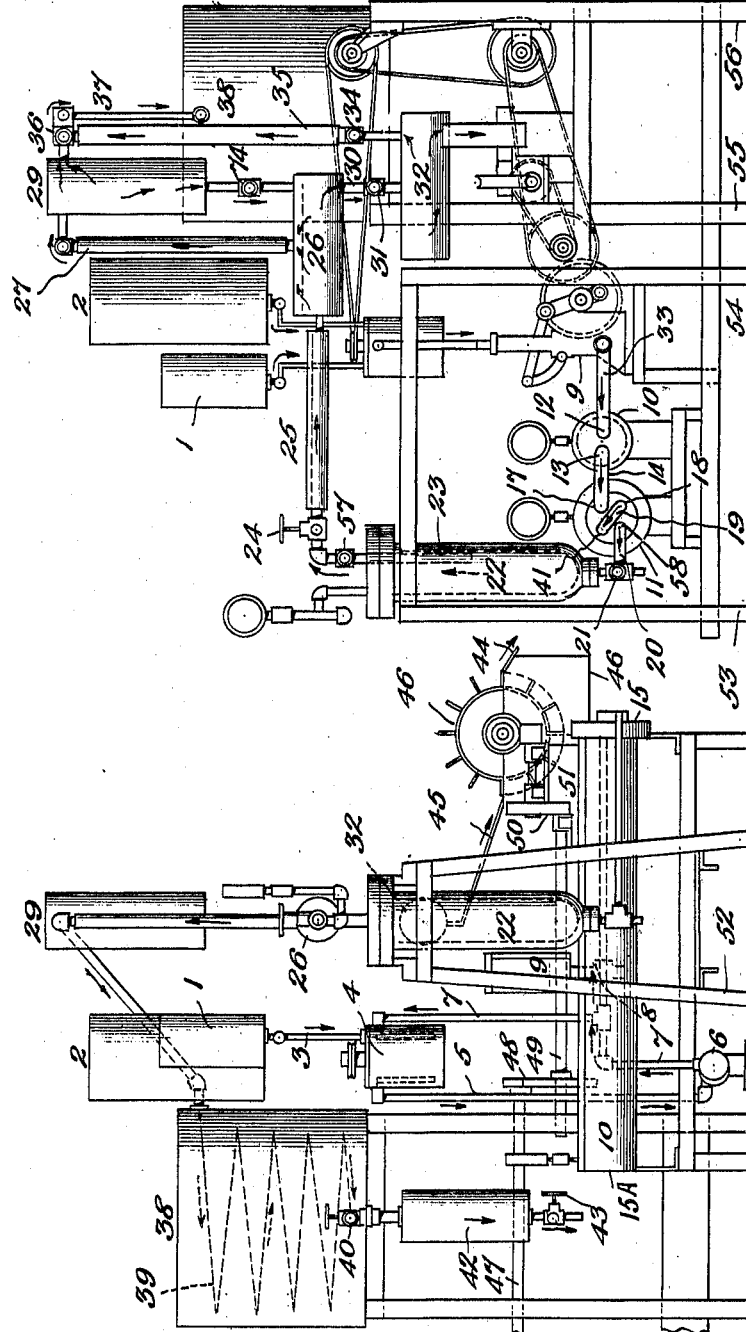

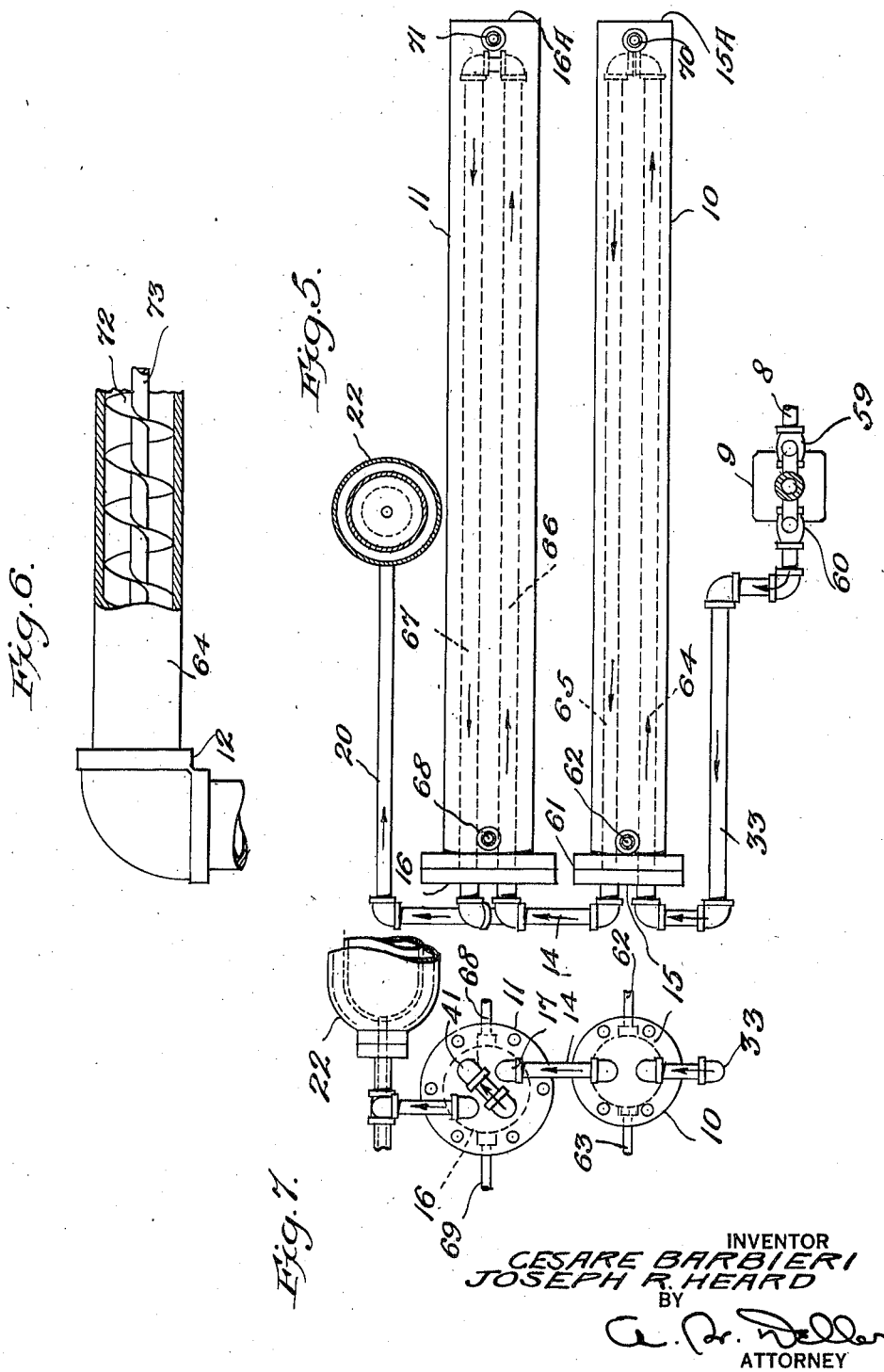

Patented Apr. 12, 1938

2,113,640

UNITED STATES PATENT OFFICE 2,113,640

CONTINUOUS PROCESS OF MANUFACTURING AMINES WITH EMULSIONS

Cesare Barbieri and Joseph R. Heard, New York, N. Y.; said Heard assignor to said Barbieri Application March 5, 1936, Serial No. 67,227

17 Claims. (Cl. 260—127)

The present invention relates to a continuous process of manufacturing amines with emulsions.

Heretofore various processes have been utilized for the production of amines. In general, prior processes were relatively inefficient, gave poor yields and produced a relatively impure product containing side reaction compounds, isomers, polymers, and the like. A particular objection against prior processes was that only small scale manufacture could be carried out and that mass production on a large industrial basis could not be carried into practice in a wholly practical and satisfactory manner. Many proposals have been made to overcome the disadvantages and avoid the shortcomings of prior processes. Of the various proposals, those attempting to produce amines on a large scale industrial basis deserve special consideration. Curme, for instance, in U. S. Patent No. 1,832,534 describes a complex process of making ethylene diamine. The Curme process required the use of a large reaction vessel under pressure partly filled with liquor and provided with cumbersome mechanical paddle agitators for splashing and mixing the liquor with the ammonia vapor and provided with a large ammonia vapor line for directly returning ammonia vapor from a complicated ammonia still, into which caustic soda is fed, to the vapor space in the upper part of the large reaction vessel. Moreover, the Curme process is essentially a modified batch process and contemplates interrupting the progress of the reaction. To avoid the disadvantages and shortcomings of the Curme process, proposals have been made to conduct the reaction in the vapor phase while other attempts proposed the addition of heavy metal compounds such as cupric chloride, copper sulfate, zinc chloride, etc., which formed compounds with ethylene diamine and which addition was intended to prevent the reaction of the diamine with more ethylene dichloride to form higher amines. These proposals were unsuccessful or unsatisfactory for one reason or another including high expense and costly reagents, low and poor yields (e. g. 18-20% or 30-50%), lack of control, large excesses of ammonia (for example, 40 mol. of ammonia to one mol. of ethylene dichloride) required, long periods of time (for example, 2 to 4 hours) for completion of the reaction, irregular and non-uniform temperatures and pressures, inadequate and inefficient distribution and transmission of heat, large and unwieldly volumes or pools of liquor and other defects.

Other attempts have been made to provide a process for the production of amines which could be carried out on an industrial scale to produce commercial products with commercial yields. Among these attempts may be mentioned those involving the use of high temperatures and/or high pressures. These processes involving relatively high temperatures had a tendency to cause the production of side reaction, polymerization and decomposition products and involved difficulties in controlling the thermal conditions. The other processes operating under high pressures required the use of a heavy, bulky and strong apparatus which was expensive to build and expensive to operate. As far as we are aware, the art has not been provided with a wholly satisfactory process which can be conducted on a commercial scale for the production of acceptable commercial products with high yields in relatively simple apparatus operating under relatively low pressures and/or temperatures.

It is an object of the present invention to overcome the aforesaid disadvantages and shortcomings of the old processes described hereinabove and to provide a continuous process of producing amines which can be controlled and which is safe, practical and commercial.

It is a further object of the invention to provide a continuous process which can be conducted on an industrial scale with commercially acceptable products and with high yields in relatively simple apparatus operating under relatively low pressures and/or temperatures which can be closely controlled and regulated.

It is also within the contemplation of the invention to provide a continuous process of producing amines in which the reaction is carried out in the liquid state in a flowing stream.

Furthermore, the present invention provides a continuous process of producing amines which can be accurately controlled, and which has no tendency to build up excessive temperatures and pressures, and which can be effected by means of emulsions.

Other objects and advantages will become apparent from the following description of the invention taken in conjunction with the accompanying drawings, in which Fig. 1 is a diagrammatic flow sheet of the present process;

Fig. 2 is similar to Fig. 1 of a modified embodiment of the invention;

Figs. 3, 4, 5, 6 and 7 illustrate a system for carrying the present process into practice on a practical scale;

Figure 8:
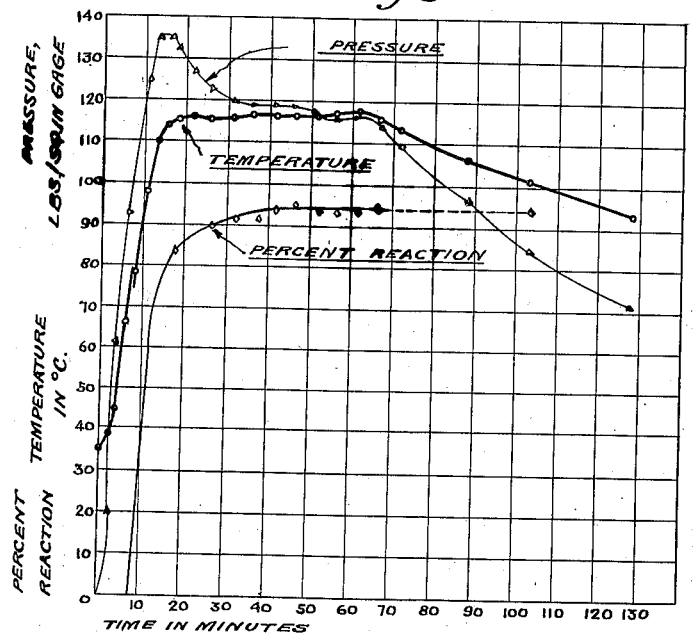
Fig. 8 depicts graphs showing the relation of pressures, temperatures and percent reaction with respect to time involved in carrying out the present process with an emulsion.

Broadly stated, the present invention contemplates a continuous process in which the reactants contact each other thoroughly in the liquid phase and the reaction is conducted practically entirely in the liquid state. In this process, the reactants are intimately mixed in the form of an emulsion. The emulsion then preferably flows as a stream in a metal conduit or pipe where the reaction occurs under relatively low pressure and/or relatively low heat conditions to form amine salts, i. e., at about 100° C. and about 100 pounds gauge pressure. By removing the liquid mass from the reaction conduit, the amine salts can be recovered in an evaporator. Water and excess of ammonia evaporated in the evaporator can be condensed as aqueous ammonia liquor and any ammonia not condensed can be absorbed with water in an absorber. The amine salts together with some ammonium chloride can be dried in an appropriate dryer and then can be introduced into distillation pots for reaction with sodium or calcium hydroxide or some other strong base. The desired amine can be distilled and collected.

The advantage of use of an emulsifying agent is shown by shaking an alkyl chloride, say ethylene chloride, with 19% ammonia solution. Where no emulsifying agent is used the heavy chloride separates to form a colorless layer within half a minute but where a small amount of ammonium oleate is present no such separation occurs until after many hours.

Contrary to conventional belief it has been found in actual practice that the emulsion does not break and is capable of being maintained practically throughout the process. Of course, the period of time elapsing between the formation of the emulsion and the use thereof is relatively short. A factor which may be of moment in this connection is the amount of ammonia which is used. It has been observed that when strong ammonia is used with alkyl halides in the presence of an emulsifying agent, an emulsion is formed which does not break readily with increased temperature as do other conventional emulsions. The emulsifying agent and some of the ammonia react to form an ammonium salt of the emulsifying agent, ammonium oleate for example. The ammonium oleate together with the amine hydrohalide are introduced into the distillation pot. Upon the addition of a causticizing agent say, sodium hydroxide, the ammonium oleate is decomposed to sodium oleate which is non-volatile under the conditions existing and remains with the sodium halide formed from the causticizing agent, sodium hydroxide, and the halide radicle of the amine hydrohalide. Thus the emulsifying agent does not contaminate the final product or introduce serious factors in the problem of purification of the amine.

For the purpose of giving those skilled in the art a better understanding of the invention the following specific examples are given for illustrative purposes:—

Example No. 1

Aqueous ammonia having a concentration ranging from about 10% (16° Bé.) to about 28% (26° Bé.) and preferably from about 10 to 20%, and relatively insoluble ethylene dichloride are emulsified, preferably in a continuous manner. The emulsion passes, preferably by pumping, through an elongated metal reaction conduit in a continuous manner. In this metal reaction conduit, optimum conditions are provided. Thus, an intimate contact of ethylene dichloride and ammonia is effected, a careful control of the pressure is maintained and a close control of the temperature is provided to insure uniform thermal conditions and the uniform distribution and efficient transmission of the large amount of heat evolved by the chemical reaction. By heating the metal reaction conduit, preferably by steam, an efficient and uniform reaction is effected with a high yield of diamine product. The liquid containing the diamine product is discharged continuously from the metal reaction conduit into an evaporator from which the diamine hydrohalide product is recovered.

Referring more particularly to Fig. 1, the present continuous process of manufacturing ethylene diamine by reacting ethylene dichloride with aqueous ammonia in an emulsion may be clearly understood by those skilled in the art.

Thus, about 20 parts ethylene dichloride, containing small amounts of oleic acid, for example, 0.5% (or 0.1 part by volume after aqua ammonia has been added) which will give an ammonium soap, or other emulsifying agent, and about 1000 parts of commercial aqueous ammonia are fed continuously into an emulsifying apparatus to form an emulsion and then into a metal reactor conduit which essentially consists of a series of metal tubes which are heated, preferably with steam, and inside of which metal helices or rods with knots properly spaced are provided to insure efficient flow of the emulsion and efficient transmission of heat. The reaction is effected at a temperature of about 100° C. to about 200° C. and preferably about 125° C. and is about 95% complete in about 40 minutes at about 125 pounds per square inch gauge pressure. A pressure of about 100 to about 300 pounds per square inch gauge pressure may be used. The reaction mixture is continuously discharged from the reactor into an evaporator where the excess ammonia and water are driven off and a concentrated solution of the ethylene diamine hydrochloride is fed continuously to a drum dryer for removal of the excess water. The excess ammonia, coming from the evaporators, is led into a cooling or condensing coil and an absorber. The ammonia recovered as condensate and in the absorber as aqueous ammonia liquor is then made up to the proper strength by addition of strong aqueous ammonia liquor and/or water and used over again. The ethylene diamine hydrochloride is discharged to a distillation pot to which sodium hydroxide or some other strong base is added. From the distillation pot ethylene diamine and higher amines are distilled and sodium chloride is discharged as a residue.

Example No. 2

If one uses other types of halides, for example, the aromatic halide, phenyl methyl chloride (benzyl chloride) good yields of amines are also obtained. With phenyl methyl chloride (or normal amyl chloride) an emulsifying agent such as oleic acid and 10 times the theoretic amount of ammonia, by operating at about 100° C. and somewhat over 100 pounds pressure (gauge) phenyl methylamine (or amylamine) is obtained in excellent yield.

Example No. 3

The operations described in Example No. 1 are followed, but about 5 parts (by volume) of ethylene dichloride, about 120 parts of 19% aqua ammonia and about 0.021 part (by weight) of sodium cymene sulfonate are used. A good yield of ethylene diamine was obtained. Sodium cymene sulfonate was replaced with egg lecithin and with sodium stearate as the emulsifying agent and equally good yields were obtained.

Example No. 4

A modified embodiment of the invention is shown in Fig. 2. In this embodiment each of the reactants is proportionally pumped continuously by separate pumps with or without preheating of each reactant to a desired or predetermined temperature into a mixing chamber where emulsification and mixing may take place before or immediately upon entering the heated metal reactor conduit. The action of emulsification and mixing may be carried out by the use of an injector, a homogenizer, or jets to produce very fine streams of ethylene dichloride moving at relatively high velocity.

An emulsifying agent, such as oleic acid with the ammonia forming a soap, ammonium oleate, and an organic halide, such as ethylene dichloride, are fed into a feed tank while aqua ammonia of proper strength is fed into a second feed tank. A pump is connected to each tank and is operated to pump proportional amounts of the reactants (ethylene dichloride and aqua ammonia) into a mixing or emulsifying chamber. From this chamber, the mixed and emulsified reactants are passed as a flowing stream into and through a reactor or series of reactors such as a serpentine pipe or a tortuous conduit. For the purpose of heating the reactor or reactors, a steam jacket or manifold is provided, preferably to surround or envelop the said reactor or reactors. By having the liquid reactants sub-divided into fine or small streams and by surrounding the same with a heating medium, the temperature of the reactants can be carefully controlled. The time of reaction may be regulated by the length of the serpentine pipe or tortuous conduit and/or the speed of the stream. The mixing or emulsifying chamber may take the form or operate in the manner of an injector, a homogenizer or operate with very fine streams of ethylene dichloride moving at high velocity into a stream of aqua ammonia.

By maintaining a reaction temperature, the reactants will be reacted under optimum conditions for best regulation of heat distribution and transfer. After the reaction has been effected, the mass of liquor is introduced into an evaporator or evaporators. The ammonia can be recovered in a condenser and the evaporated residue can be sent to a dryer for the diamine salts. These salts can be mixed with an alkaline material, such as caustic soda, and distilled in a distillation pot. Ethylene diamine, higher amines and ammonia can be condensed while sodium chloride can be recovered from the residue.

The ammonia collected in the condenser can be obtained as aqua ammonia whereas the ammonia gas can be sent to an absorber where it is absorbed in water to form aqua ammonia. The condensed ammonia and the absorbed ammonia are pumped to a used ammonia storage which supplies the aqua ammonia feed tank. In the event more ammonia is required, aqua ammonia having a concentration of say 26° Bé. may be fed into the feed tank. Water may likewise be fed into the feed tank.

Example No 5

For carrying the present process into practice a system such as shown in Figs. 3, 4, 5, 6 and 7 may be employed.

The organic dihalide, such as ethylene dichloride, for example, is kept ready for use in tank 1 (see Figs. 3 and 4) which is preferably made of corrosion resistant metal and which is suitably supported. The aqueous ammonia solution is stored in a similar tank 2 which is suitably supported by columns. The contents of tanks 1 and 2 are fed continuously or intermittently through pipe 3 and others (not shown) to emulsifier 4 which may be constructed of corrosion resistant metal, such as stainless steel like the other units of equipment. In this emulsifier, the reactants are emulsified by any well known method such as, for example, by an injector. The organic dihalide may contain an emulsifying agent such as oleic acid in an amount such as will serve to form an emulsion.

The emulsified reactants in the emulsifier 4 are withdrawn continuously through pipe 5 by pump 6 and are returned to the emulsifier through pipe 7. At T 8 on pipe 7 a connection is made with pump 9 by means of which emulsion feed pump 9 draws the emulsified reactants from the circulating return line 7 and delivers the emulsified reactants to the steam-jacketed reactor 10 which is provided with a head 15 and a bottom 15A (see Fig. 3), where the temperature is maintained within the approximate limits of about 100° C. to 150° C.

In the reactor, the horizontal tubes may contain metal helices or the like (see Fig. 6) which provide a tortuous path for the stream of reactants and which make it possible to effect efficient distribution and transfer of heat and to maintain the reactants in an emulsified state.

The path of the emulsified reactants into, through and out of the reactor 10 can be followed by referring to Fig. 4. The emulsified mass is pumped by emulsion feed pump 9 through pipe 33 and elbow 12 into a multipass reactor 10. The partially reacted emulsion passes out of reactor 10 through elbow 13 and pipe 14 to enter reactor 11 through elbow 17, thence through a stage of the multipass steam-jacketed reactor to pass through elbow 18, pipe 19, and elbow 41 to another stage of the reactor. Reactor 11 is provided with a head 16 and a bottom 16A (Fig. 5). The emulsified mass now nearly completely reacted flows out of reactor 11 via elbow 59 and pipe 20 through T 21 into a steam-jacketed pressure reservoir 22 which is mounted on support 53 and in which the level of the contents is maintained practically constant by means of any suitable outlet pipe 23. The reacted products and excess of aqua ammonia continuously pass through T 57 under the regulation of valve 24 and through conduit 25 to a steam-jacketed evaporator 26. In evaporator 26, most of the excess ammonia together with some dihalide is evaporated and is conducted by means of pipe 27 to a spray trap and expansion chamber 29. The liquid from the spray trap 29 is returned continuously to evaporator 26 through valve 74. The solution remaining in evaporator 26 flows via pipe 30 and valve 31 to a steam-jacketed evaporator 32 where practically all the residual ammonia and most of the water are evaporated. The evaporated ammonia and water flow through valve 34 and conduit 35 to join the vaporized effluent of the spray trap and expansion chamber 29 at joint 36 and flow together through pipe 37 into condenser 38 where the condensation of aqua ammonia takes place in coil 39 indicated by the broken line (Fig. 3). The condensate is collected in the ammonia receiver 42 where it may be removed by means of valve 43 for blending or for dilution as required to proper strength for reuse in aqua ammonia storage tank 2. The uncondensed ammonia vapor is conducted by means of a T at 40 to a water spray system (not shown) where it is absorbed. The ammonia absorbed in the water spray system when at proper strength is pumped to the ammonia storage tank 2 for reuse.

The concentrated solution remaining in the evaporator 32 (Fig. 3) is conveyed by means of a trough 45 to a continuous steam-heated drum dryer 46 where the solids are separated from the remaining water. A main drive shaft 47 is provided with a pulley 48 and also with a countershaft 49, a pulley 50 and a belt drive 51 which actuate the drum dryer.

The solids are delivered continuously in practically dry form from the dryer at the outlet 44. In this condition, the solids are ready for the liberation of the amine by distillation in the presence of caustic soda or of any suitable alkaline material. On the other hand, the products may be stored or delivered to the trade.

The apparatus is supported in a suitable manner such as by means of columns 53, 54, 55, and 56.

Although any suitable reactor may be used in which the emulsified mass is in the form of divided streams, it is preferred to use the reactor illustrated in Figs. 5, 6 and 7.

The emulsion is picked up from the emulsion circulation line 7 at T 8 (Fig. 3) by the emulsion feed pump 9 through check valve 59 (Fig. 5) and pumped through check valve 60 and pipe 33 to the first stage reactor which is preferably a multi-pass reactor 10 which consists of an insulated steel cylinder of suitable corrosion-resistant metal construction and which is made with one end 61 flanged to receive a flanged head 15 carrying the reactor tubes and the other end 15A sealed to form a jacket for a heating fluid. The jacket is also provided with an inlet 62 and an outlet 63 (Fig. 7) for the heating fluid and with gauge 70.

The reacting emulsion passes through pipes 64 and 65 in reactor 10 and through pipe 14 into reactor 11. This reactor has a construction similar to that of reactor 10. The emulsified reactants pass from pipe 14 into a plurality of tubes 66 and 67 in reactor 11 and thence via pipe 29 to the steam-jacketed reservoir 22. Reactor 11 is provided with auxiliaries including an inlet 68 and outlet 69 (Fig. 7) for heating fluid and with gauge 71.

In Fig. 6 is shown the preferred construction of the tubes of the reactors 10 and 11. The emulsified mass enters the tube 64 through elbow 12 and is kept in an emulsified state by means such as a helix 72 supported by any suitable means such as rod 73.

Figure 9:
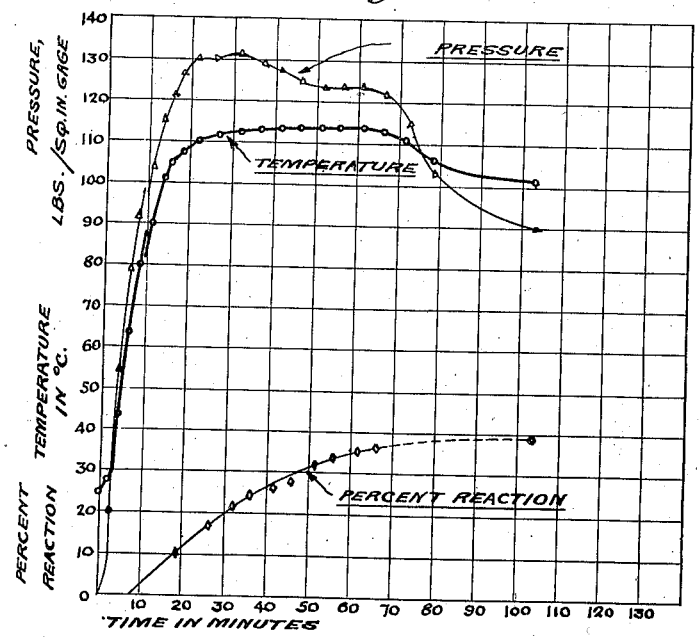
Fig. 9 is similar to Fig. 8 except the process is conducted without an emulsion.

By comparing the graphs in Figs. 8 and 9, it will be observed that the present emulsion process effects about a ninety-five per cent reaction in about 40 minutes, whereas only a 40 per cent reaction is effected and twice the time is required if the only change in procedure is the omission of an emulsifier. The temperature and the pressure rise sharply within the first twenty minutes to a maximum and then remain at a more or less constant value around about 120° C. and about 120 pounds per square inch.

It is to be noted that the process is not only continuous for making the product but also for recovering the dry salt. That is, the distillation of the ammonia and its condensation are continuous, the evaporation of the water from the salt formed is continuous and the obtaining of the salt in dry form is continuous. The resulting dry salt consists principally (60 to 75%) of ethylene diamine hydrochloride, but does carry 5 to 15% of ammonium chloride with the balance of the higher amine hydrochlorides.

Wherever the expression "commercial aqueous ammonia" is used herein, it is to be understood that such term designates the common aqueous ammonia which has an ammonia concentration of about 10 to 28%. Similarly, wherever the expression "emulsifying agent" is used, it is intended to include not only the specific agents mentioned herein but also other suitable emulsifying agents known to those skilled in the art, including oleic acid and soaps thereof, Turkey red oil (sulfonated castor oil), stearic acid and soaps thereof, lecithin, a cymene sulfonate (e. g., sodium cymene sulfonate), diglycol stearate, a salt of sulfonated petroleum (e. g., a sodium salt), a salt of sulfated alcohols (e. g., cetyl sulfate), etc.

In the foregoing illustrative examples, the production of phenyl methylamine, of amylamine and of ethylene diamine was described. Of course, other amines can be produced. Thus, amines can be manufactured from the halides of saturated and unsaturated aliphatic hydrocarbons as well as of other hydrocarbons including aromatic, etc., hydrocarbons. Among the halides of unsaturated aliphatic hydrocarbons may be mentioned the following: ethylene dichloride, ethylene dibromide, ethylene chlorobromide, propylene dichloride, propylene dibromide, and propylene chlorobromide. Among the saturated hydrocarbons the following may be mentioned: ethyl bromide, ethyl chloride, isopropyl bromide, isopropyl chloride, propyl bromide, propyl chloride, butyl bromide, butyl chloride, amyl bromide, amyl chloride and benzyl chloride. For convenience, the following schedule has been given of various raw materials or reagents which may be used in the present process.

Schedule

| Reagent | Boiling point | Normal state | Amines produced | Boiling point |
|---|---|---|---|---|
| | °C. | | | °C. |
| Ethylene dichloride | 84 | Liquid | Ethylene diamine. | 118 |
| Ethylene dibromide | 131 | do | do | 118 |
| Ethylene chlorobromide | 107 | do | do | 118 |
| Propylene dichloride | 97 | do | Propylene diamine. | 120 |
| Propylene dibromide | 142 | do | do | 120 |
| Propylene chlorobromide | 114 | do | do | 120 |
| Ethyl bromide | 39 | do | Ethyl amine | 19 |
| Ethyl chloride | 12 | do | do | 19 |
| Isopropyl bromide | 60 | do | Isopropyl amine | 32 |
| Isopropyl chloride | 36 | do | do | 32 |
| Propyl bromide | 71 | do | Propyl amine | 49 |
| Propyl chloride | 46 | do | do | 49 |
| Butyl bromide | 101 | do | Butyl amine | 78 |
| Butyl chloride | 78 | do | do | 78 |
| Amyl bromide at 740 mm. | 128 | do | Amyl amine | 104 |
| Amyl chloride at 740 mm. | 107 | do | do | 104 |
| Benzyl chloride | 179 | do | Benzyl amine | 185 |
| Phenyl ethyl chloride | 190–200 | do | Phenyl ethyl amine. | 198 |

2,113,640    5

We claim:—

1. In the process of producing amines that improvement which comprises continuously forming a relatively stable emulsion of a lower alkyl halide and aqueous ammonia and then heating the said emulsion to cause the formation of an amine hydrohalide.

2. In the process of producing amines that improvement which comprises continuously forming an emulsion of a lower alkyl halide in the liquid state, aqueous ammonia and an emulsifying agent, and subjecting said emulsion to heat of about 100° C. to cause the formation of an amine hydrohalide.

3. In the process of producing amines that improvement which comprises continuously emulsifying aqua ammonia, a lower alkyl halide, an emulsifying agent, all essentially in the liquid phase and subjecting said emulsion to heat of about 100° C. at a gauge pressure of about 100 pounds per square inch to cause the formation of an amine hydrohalide.

4. In the process of producing amines that improvement which comprises continuously forming an emulsion comprising essentially a lower alkyl halide in the liquid state, and an emulsifying agent, introducing said emulsion into a reaction vessel contaiinng aqueous ammonia and subjecting the reacting vessel to a heat of about 100° C. to effect the generation of a low pressure of about 100 to about 150 pounds per square inch gauge, whereby a lower alkyl amine hydrohalide is formed.

5. In the process of producing amines that improvement which comprises continuously forming an emulsion comprising essentially a lower alkyl halide and an emulsifying agent, introducing the emulsified mass into a reaction vessel containing aqueous ammonia, subjecting the contents of said reaction vessel to heat to effect the generation of a gauge pressure of the order of 100 to 150 pounds per square inch whereby an amine hydrohalide is formed.

6. In the process of producing amines that improvement which comprises continuously forming an emulsion comprising essentially a lower alkyl halide, an emulsifying agent and aqueous ammonia, continuously passing the emulsified mass through a reaction vessel, maintaining the contents of said vessel in an emulsified state, and heating the said emulsified mass to a temperature of about 100° C. while at a gauge pressure of about 100 pounds per square inch whereby an amine hydrohalide is formed, causing the mass containing said amine hydrohalide to flow continuously to evaporation for the removal of excess aqueous ammonia and water, and returning said aqueous ammonia to the first step hereof.

7. In the process of producing amines that improvement which comprises continuously emulsifying aqua ammonia, a lower alkyl halide in the liquid state and an emulsifying agent to form an emulsified mass, continuously passing the emulsified mass through a reaction vessel, maintaining said mass in an emulsified state, heating said mass to a temperature of about 100° C. while at a gauge pressure of about 100 pounds per square inch whereby an amine hydrohalide is formed, causing said practically completely reacted mass to flow continuously to evaporators, continuously removing excess aqueous ammonia and any lower alkyl halide, returning said aqueous ammonia and lower alkyl halide to the first steps thereof, passing the solution of amine hydrohalide to a continuous dryer for the separation of solids from the water, and discharging the amine hydrohalide substantially continuously in practically a dry condition.

8. In the process of producing amines, that improvement which comprises continuously forming an emulsion comprising essentially about 1000 parts by volume of aqueous ammonia, 20 parts by volume of ethylene dichloride and bout 0.1 part by volume of oleic acid, continuously passing the emulsified mass through reaction vessels where the contents are kept in an emulsified state, heating the reaction vessels to maintain a temperature of about 100° C. and a gauge pressure of about 100 pounds per square inch to effect a practically complete reaction in said mass, causing said practically completely reacted mass to flow continuously to an evaporator for the removal of the excess aqueous ammonia and ethylene dichloride and for the concentration of said ethylene diamine hydrochloride, returning said aqueous ammonia and ethylene dichloride to the first step hereof, conveying the said concentrated ethylene diamine hydrochloride to a continuous dryer for continuously separating the ethylene diamine hydrochloride from the water, and recovering the ethylene diamine hydrochloride from the dryer in practically dry state.

9. The process of producing amines which comprises forming an emulsion of a lower alkyl halide with aqua ammonia and an emulsifying agent, moving said emulsion as a relatively small flowing stream, and then subjecting the said flowing stream of emulsion to heat to cause the formation of an amine hydrohalide.

10. The process of producing amines which comprises forming an emulsion comprising essentially aqua ammonia, a lower alkyl halide and an emulsifying agent, reducing said emulsion to a relatively small flowing stream, and subjecting said flowing stream of emulsion to heat of about 100° C. and pressure of about 100 to about 150 lbs. per sq. in. to cause the formation of an amine hydrohalide.

11. The process of producing an amine which comprises emulsifying aqua ammonia, a lower alkyl halide, and oleic acid to form an emulsion, forming said emulsion into a flowing stream, and subjecting said stream of emulsion to relatively low heat of about 100° C., the pressure produced by said temperature to cause the formation of amine hydrohalide.

12. The process of producing an amine which comprises pumping aqua ammonia, a lower alkyl halide and an emulsifying agent into a stream to form an emulsion, passing said emulsion as a stream through a tortuous path, and subjecting the emulsion in said path to heat in order to give a relatively low pressure between about 100 and about 150 pounds per square inch to cause the formation of an amine hydrohalide.

13. A process of producing amines which comprises forming an emulsion comprising essentially a liquid lower alkyl halide, aqua ammonia and an emulsifying agent, introducing said emulsion as a stream into a tortuous path within a metal conduit, and subjecting said metal conduit to heat to effect the generation of a relatively low pressure between about 100 and about 150 pounds per square inch whereby a lower alkyl amine hydrohalide is formed.

14. The process of producing amines which comprises continuously reacting an emulsion comprising essentially an emulsifying agent, a lower alkyl halide and aqua ammonia in a flowing stream to form an amine hydrohalide, continuously removing said stream containing an amine hydrohalide, and causticizing said amine hydrohalide to produce an amine and an alkali halide.

15. The process of producing amine which comprises continuously forming an emulsion comprising essentially about 1000 parts by volume of commercial aqua ammonia, about 20 parts by volume of ethylene halide, and about 0.1 part by volume of oleic acid, continuously introducing said emulsion into a tortuous path in a metal conduit, and subjecting said metal conduit to heat to give a temperature of the order of about 100° C. and a low pressure of the order about 100 pounds per square inch to cause the formation of ethylene diamine hydrohalide.

16. In the process of producing amines that improvement which comprises forming an emulsion comprising essentially about 1000 parts by volume of commercial aqueous ammonia, 20 parts by volume of ethyl bromide and about 0.1 part by volume of oleic acid, continuously passing the emulsified mass through reaction vessels where the contents are kept in an emulsified state, heating the reaction vessels to maintain a temperature of about 100° C. to effect a practically complete reaction in said mass, causing said practically completely reacted mass to flow continuously to an evaporator for the removal of the excess aqueous ammonia and ethyl bromide and for the concentration of said ethylamine hydrobromide, returning said aqueous ammonia and ethyl bromide to the first step hereof, conveying the said concentrated ethylamine hydrobromide to a continuous dryer for continuously separating the ethylamine hydrobromide from the water, and recovering the ethylamine hydrobromide from the dryer in practically dry state.

17. In the process of producing amines that improvement which comprises forming an emulsion comprising essentially about 1000 parts by volume of commercial aqueous ammonia, 20 parts by volume of isopropyl bromide, about 0.1 part by volume of oleic acid, continuously passing the emulsified mass through reaction vessels where the contents are kept in an emulsified state, heating the reaction vessels to maintain a temperature of about 100° C. and a gauge pressure of about 120 pounds per square inch to effect a practically complete reaction in said mass, causing said practically completely reacted mass to flow continuously to an evaporator for the removal of the excess aqueous ammonia and isopropyl bromide and for the concentration of said isopropylamine hydrobromide, returning said aqueous ammonia and isopropyl bromide to the first step hereof, conveying the said concentrated isopropylamine hydrobromide to a continuous dryer for continuously separating the isopropylamine hydrobromide from the water and recovering the isopropylamine hydrobromide from the dryer in practically dry state.

CESARE BARBIERI.
JOSEPH R. HEARD.